United States Patent [19]
Yeon

[11] Patent Number: 5,821,736
[45] Date of Patent: Oct. 13, 1998

[54] CHARGE MODE CONTROL IN A BATTERY CHARGER

[75] Inventor: Sang-Heum Yeon, Seoul, Rep. of Korea

[73] Assignee: Samsung Electronics Co., Ltd., Suwon, Rep. of Korea

[21] Appl. No.: 758,851

[22] Filed: Dec. 2, 1996

[30] Foreign Application Priority Data

Dec. 2, 1995 [KR] Rep. of Korea .................. 1995-46235

[51] Int. Cl.$^6$ ............................. H02J 7/04; H02J 7/16
[52] U.S. Cl. ........................ 320/148; 320/160; 320/161
[58] Field of Search ................... 320/5, 20, 21, 320/22, 23, 27, 29, 30, 31, 32, 39, 40, 125, 128, 132, 134, 148, 156, 160, 161, DIG. 17

[56] References Cited

U.S. PATENT DOCUMENTS

| | | | |
|---|---|---|---|
| 4,354,148 | 10/1982 | Tada et al. ................................. | 320/20 |
| 4,746,852 | 5/1988 | Martin ....................................... | 320/20 |
| 4,755,735 | 7/1988 | Inakagata ............................... | 320/20 X |
| 5,304,917 | 4/1994 | Somerville ............................ | 320/20 X |
| 5,307,001 | 4/1994 | Heavey .................................. | 320/20 X |
| 5,489,836 | 2/1996 | Yuen ..................................... | 320/20 X |

*Primary Examiner*—Edward Tso
*Attorney, Agent, or Firm*—Marger, Johnson, McCollom & Stolowitz, PC

[57] ABSTRACT

A control circuit controls a battery charger so as to prevent damage to NiCAD or NiMH batteries resulting from overheating due to overcharging. During charging, the battery voltage is monitored through a filter, buffer, amplifier and sample and hold circuit. The sampled voltage is time differentiated to determine its rate of change, and a control signal is generated for switching the battery charger from a rapid charge mode to a trickle charge mode when the negative rate of change of the battery voltage exceeds a pretermined reference voltage, thereby identifying that the battery voltage has started to decay from its peak voltage.

8 Claims, 4 Drawing Sheets

CHARGE MODE CONTROL IN A BATTERY CHARGER

FIELD OF THE INVENTION

The present invention relates to a battery charging apparatus and more specifically to battery charging circuit with a mode control circuit for automatically switching from a rapid charge mode to a trickle charge mode so as to minimize charging/recharge time while preventing damage to the battery that can result from overcharging a rechargeable battery.

BACKGROUND OF THE INVENTION

Portable electronic devices which require rechargeable batteries have proliferated in recent years. Examples include laptop computers, cell phones, PDA (personal digital assistant) and the like. It is desirable, of course, for these portable electronic devices to be rapidly rechargeable, to have as long a battery life as possible between battery charges, and to be durable in the sense of allowing many recharge and discharge cycles. In designing a rapid recharge system, it is very important to accurately detect when the rechargeable battery is completely charged for the purpose of switching from a rapid charge mode to a trickle charge mode or shutting off the recharging operation. If a completely recharged battery continues to be rapidly recharged, the life of the battery may be reduced due to the rapid rise in internal temperature that results from overcharging. Especially NiMH (nickel-metal hydride) battery cells are relatively fragile in this regard, and can be fatally damaged from overcharging. Accordingly, while a battery is being recharged at high speed, it is very important that the rapid recharging operation be interrupted in a timely manner to avoid damage to the battery.

Several techniques are known for detecting a fully charged state of a battery during a recharging operation. One of these techniques is to measure a charge rate of the battery voltage as a function of the charging time, i.e., $dV_{batt}/dt$. As the battery approaches a fully charged condition, this rate of change will decrease. In other words, the battery voltage levels off at some fully charged voltage. Another known technique is to measure a voltage drop $-\Delta V_{batt}$ of a battery at charge completion time. It is known that some rechargeable batteries exhibit a drop in battery voltage after they are completely charged. A further technique is to measure a change in temperature of the battery resulting from the charging operation.

Various techniques are used with various types of batteries. For a NiCAD battery, a $-\Delta V_{batt}$ detector is used as the principle detection element of a battery charging circuit. For a NiMH battery, a peak voltage detector is more commonly used as the principle detection element in a battery charger.

U.S. Pat. No. 4,746,852 discloses a conventional battery charging apparatus which finds the peak battery voltage in connection with recharging a NiCAD battery, by determining the rates of charge (differentiation) of the battery voltage. The preferred embodiment described in U.S. Pat. No. 4,746,852 is a digital implementation in which a microprocessor carries out digital to analog conversion for comparing a battery voltage to selected inquiry voltages. The '852 patent also discloses an analog circuit for terminating battery charging as a function of a time derivative of measured battery voltage.

The circuitry disclosed in '852, however, is relatively complicated and therefore occupies substantial area of an integrated circuit. The need remains, therefore, for improvements in battery recharging circuits in order to reduce cost and size, particularly for applications in portable electronic equipment.

SUMMARY OF THE INVENTION

It is an object of the present invention therefore to provide a battery charging apparatus which is relatively small in size, and which can be fabricated at relatively low production costs.

It is an additional object of the present invention to provide a method of detecting a peak battery voltage for controlling a battery charger to switch from a rapid charge mode to a trickle charge mode of operation or to discontinue charging, the method comprising the steps of monitoring the battery voltage; time differentiating the battery voltage to determined its rate of change; detecting when the rate of change of the battery voltage changes from a positive $\Delta V$ to a negative $-\Delta V$; comparing the negative $-\Delta V$ to a predetermined reference voltage; and if the magnitude of the negative $-\Delta V$ exceeds the reference voltage, changing the charging mode from the rapid charge mode to a trickle charge mode of operation or discontinuing charging of the battery.

It is another object of the present invention to provide a control circuit to control a battery charger so as to prevent damage to NiCAD or NiMH batteries resulting from overheating due to overcharging. During charging, the battery voltage is monitored through a filter, buffer, amplifier and sample and hold circuit. The sampled voltage is time differentiated to determine its rate of change, and a control signal is generated for switching the battery charger from a rapid charge mode to a trickle charge mode when the negative rate of change of the battery voltage exceeds a pretermined reference voltage, thereby identifying that the battery voltage has started to decay from its peak voltage.

The foregoing and other objects, features and advantages of the invention will become more readily apparent from the following detailed description of a preferred embodiment which proceeds with reference to the drawings.

DETAILED DESCRIPTION OF A PREFERRED EMBODIMENT

Figure 1:
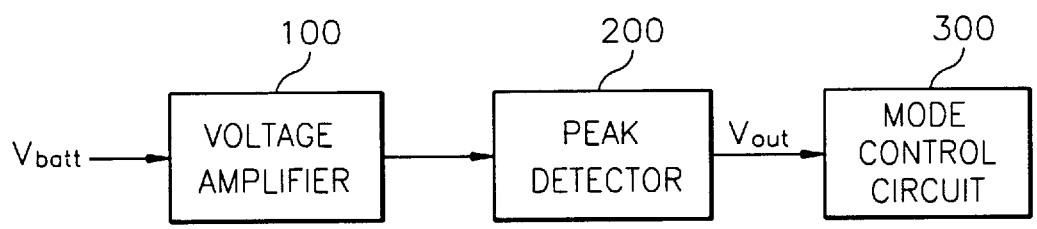
FIG. 1 is a block diagram of a battery charging apparatus with a mode changing controller which is constructed according to the present invention.

Referring to FIG. 1, a simplified block diagram illustrates the battery voltage $V_{batt}$ input to a voltage amplifier 100. The amplified voltage is provided to a peak detector circuit 200, further described below, which in turn switches an output voltage $V_{out}$ from a first state to a second state. The $V_{out}$ control signal is input to a mode control circuit 300 which terminates charging or switches from a rapid charge mode to a trickle charge mode in response to the control signal.

Figure 2:
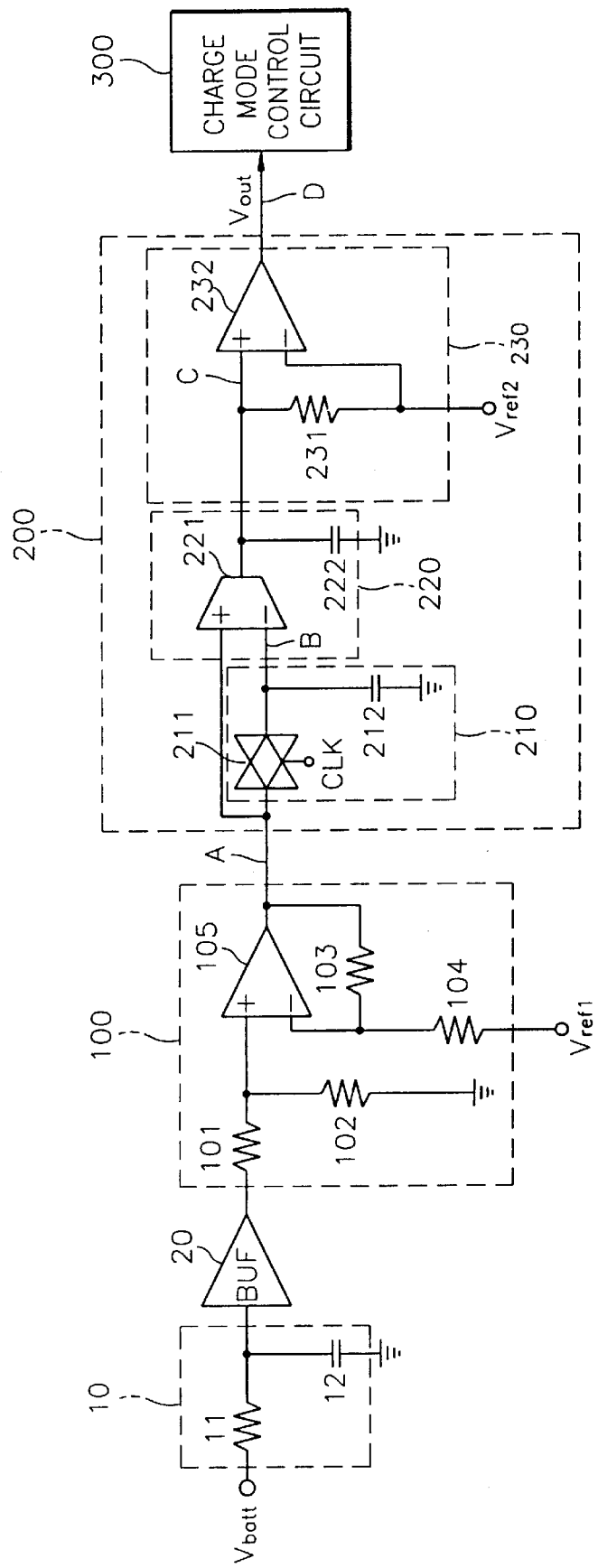
FIG. 2 is a detailed circuit diagram of the battery charging apparatus of FIG. 1.

FIG. 2 illustrates a battery charging apparatus in greater detail. In FIG. 2, the battery voltage $V_{batt}$ optionally is input through a filter circuit 10 comprising a series resistor 11 and shunt capacitor 12, for the purpose of filtering noise such as noise that appears as a result of a switching type power supply used for recharging the battery. The battery voltage output from the filter circuit 10 is input to a buffer circuit 20 for restoring the battery voltage. The filter circuit 10 and buffer circuit 20 can be omitted in applications where the battery charging voltage is not unduly noisy or where a constant current source is used for charging the battery. Battery voltage, optionally filtered and buffered, is input to an amplifier circuit 100 comprising an input voltage divider circuit, resistors 101 and 102, and a differential amplifier 105. The output of the resistor network 101, 102, is applied at the non-inverting input differential amplifier 105. A reference voltage $V_{ref1}$ is provided to the inverting input of amplifier 105 via series resistor 104 and a feedback resistor 103. The amplifier stage 100 is arranged, by selection of appropriate resistor values, to provide a gain of K so that the voltage at the output terminal A is equal to $K \cdot V_{batt}$.

The voltage A is input to the peak detector circuitry 200. The peak detector 200 includes a sample and hold circuit 210, a voltage to current convertor 220, and a comparator circuit 230, as shown in FIG. 2. The sample and hold circuit 210 comprises a transmission gate 211 and a capacitor 212 for holding a voltage at the output of transmission gate 211. The transmission gate 211 has a clock terminal CLK to which a periodic clock signal is applied for periodically sampling the voltage A and storing it at the capacitor 212. The voltage to current convertor 220 comprises a transconductance amplifier 221 and capacitor 222 connected between the output of the transconductor amplifier and ground. The input voltage A is applied directly to the non-inverting input of the transconductance amplifier 221 and the voltage at the output of the transmission gate 211, i.e., V212, is applied at the inverting input to the transconductance amplifier, node B.

The output of the transconductance amplifier 221 also is applied to a comparator stage 230, at node C. A comparator stage 220 includes a differential amplifier 232. A second reference voltage $V_{ref2}$ is applied to the inverting input of differential amplifier 232, and also is applied through a resistor 231 to the non-inverting input at node C, so that the comparator stage 230 compares the input voltage at node C to the reference voltage $V_{ref2}$ and drives the output $V^{out}$ at node D to a high state if the voltage at node C is greater than $V_{ref2}$ and conversely, drives $V_{out}$ to a low state when the applied voltage C is less than $V_{ref2}$. The output voltage $V_{out}$ is applied to a charge mode control circuit 300 as noted above.

Operation of the circuitry of FIG. 2 will be described next with reference to the voltage plots of FIGS. 3, 4 and 5.

When a rapid charge of a battery is carried out with a source voltage from a switching mode power supply, a battery voltage $V_{batt}$ contains a switching noise caused by the rapid charge. Such a switching noise is filtered by the filter circuit 10 which is shown in FIG. 2. The battery voltage filtered thus is applied through the buffer circuit 20 to the input of the voltage amplifier circuit 100. By the buffer circuit 20, the filtered battery voltage can be prevented from being lowering in voltage level. Additionally, if the battery is charged with a constant-current source instead of a switching mode power supply, the battery charging apparatus requires neither the filter circuit 10 nor the buffer circuit 20.

The voltage amplifier circuit 100 amplifies a difference, which is a variation of the battery voltage depending on time, between a reference voltage and an output voltage of the buffer circuit 20 with respect to a transfer function of K. This is because a variation of the battery voltage depending on time is extremely slight in detecting a peak value of the battery voltage. Accordingly, the voltage amplifier circuit 100 has $K \cdot V_{batt}$, which is provided at a point "A" of FIG. 2, as the output voltage thereof to be provided through two paths to a differential circuit of the peak detector 200. The output voltage of the circuit 100 is commonly applied to the input terminals of the sample and hold circuit 210 and the voltage-current converter 220, which constitute a differential circuit. The output voltage of the amplifier circuit 100 is sampled by a transfer gate 211 synchronous with a clock CLK and held by a capacitor 212. Additionally, instead of the transfer gate 211, a CMOS transistor or a bipolar transistor may be used.

Figure 3:
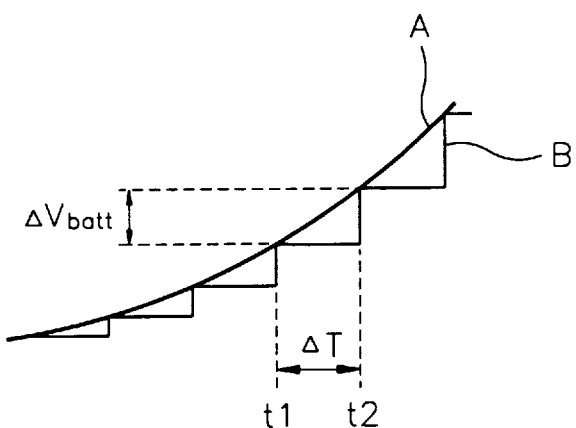
FIGS. 3 through 5 are waveform diagrams of voltages at points A and B of FIG. 2 so as to show a voltage variation depending on the charge state of a chargeable battery.
Figure 4:
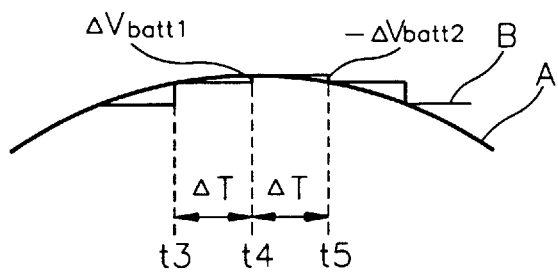
Figure 5:
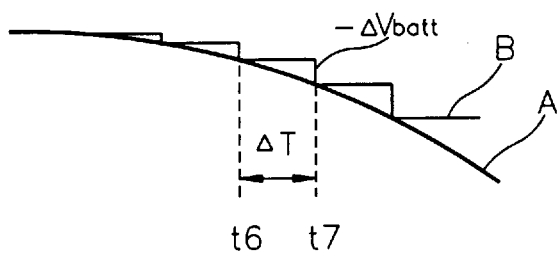

FIGS. 3 through 5 are waveform diagrams of voltages at points A and B of FIG. 2 so as to show voltage variation depending on the charge state of a chargeable battery. FIG. 3 shows a voltage variation at the point A and B of FIG. 2 before a battery is fully charged.

Assuming for a brief description that the transfer characteristic of the differentiation circuit in the peak detector 200 is indicated by "G" and the increment of an output voltage of the voltage amplifier 100 during the interval between t1 and t2 is indicated by $\Delta V_{batt}$. As shown in FIG. 3, during the interval $\Delta T$ between T1 and t2, the differential value, i.e., a voltage at the point C of FIG. 2, of the output voltage of the voltage amplifier circuit 100 can be obtained as follows:

$$G \cdot (\Delta T \cdot K \cdot \Delta V_{batt})/2 \quad (1)$$

On the other hand, if an output of the voltage amplifier 100 is provided to an inverting input terminal of the transconductance amplifier 221, and the output of the sample-hold circuit 210 is provided to a noninverting input terminal of the amplifier 221, the differential value at the point C of FIG. 2 becomes $-G \cdot (\Delta T \cdot K \cdot \Delta V_{batt})/2$.

FIG. 4 shows voltage variation at the point A and B of FIG. 2 in case that a battery is fully charged. It can be seen from FIG. 4 that a battery voltage is increasingly varied until the battery is perfectly charged, but after t4, i.e., when the battery is fully charged, the battery voltage is rather decreasingly varied because of the voltage amplifier 100 at t4 is $\Delta V_{batt1}$ and the increment at t5 is $-\Delta V_{batt2}$, the differential value at the point C during the time between t3 and t5 can be obtained as follows:

$$G \cdot (\Delta T \cdot K \cdot \Delta V_{batt1})/2 + G \cdot \{\Delta T \cdot K \cdot (-\Delta V_{batt2})\}/2 = \quad (2)$$
$$(1/2 \cdot G \cdot \Delta T \cdot K \cdot (\Delta V_{batt1} - \Delta V_{batt2})$$

Since each of $\Delta V_{batt1}$ and $\Delta V_{batt2}$ indicates a variation value of the battery voltage at t4 (the complete charging of the battery), i.e., in the vicinity of the peak in the voltage curve of FIG. 4, $\Delta V_{batt1}$ is almost equal to $\Delta V_{batt2}$. Therefore, a differential value which is obtained by the differential circuit during the time between t3 and t5 becomes nearly zero.

FIG. 5 shows voltage variation at the points A and B after a battery is completely charged. As shown in FIG. 5, because a spontaneous discharging is continuously performed in the battery after the complete charging of the battery voltage, the variation value of the battery voltage is negative. Then the differential value at the point C of FIG. 2 can be obtained as follows:

$$G \cdot \{\Delta T \cdot K \cdot (-\Delta V_{batt})\} \quad (3)$$

Figure 6:
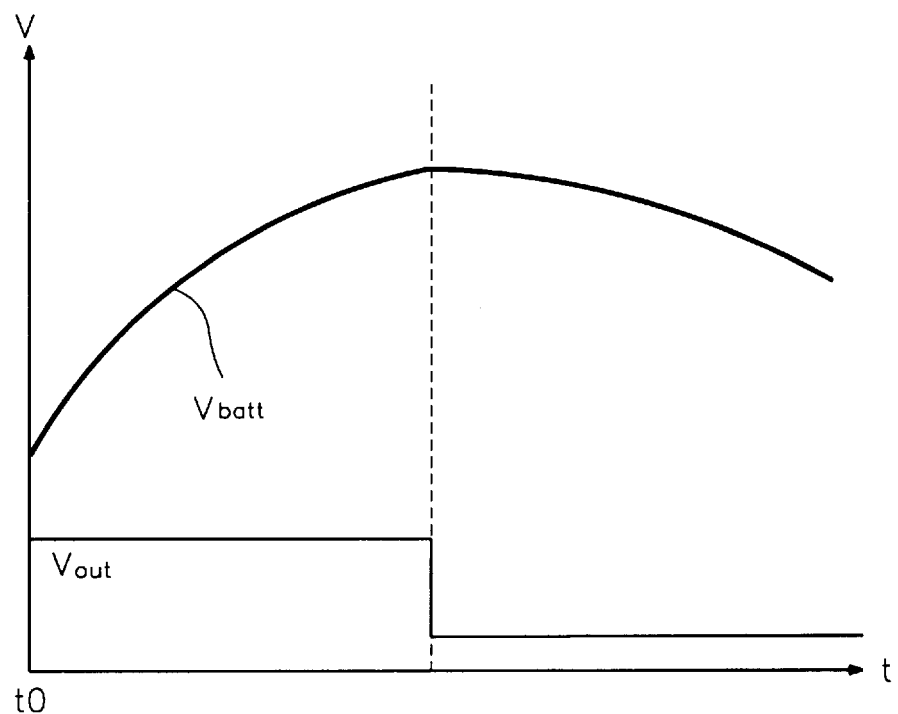
FIG. 6 is a diagram showing that the output of the battery detector shown in FIG. 2 is changed from high level to low level in accordance with a charging voltage of the chargeable battery.

As described above, it can be understood that the voltage at the point C is in proportion to the gradient of the voltage curve. As shown in FIG. 6, if a reference voltage $V_{ref2}$ for the operational amplifier 232 is preset as a voltage at the point C when a battery is completely charged, a voltage at the point D of FIG. 2, i.e., the output voltage $V_{out}$ of the amplifier 232, is maintained at "high level" before the battery is fully charged, and it is lowered to a "low level" between the time of t3 and t5. Hence, the charge mode control circuit 300 can control the charge mode of a chargeable battery from a rapid charge mode to a trickle charge mode, and control the charging operation of the battery to be terminated. As a result, the chargeable battery can be prevented from being damaged when it continues to be charged at high speed.

What is claimed is:

1. A control circuit for a battery charger comprising:
    a sample and hold circuit for periodically sampling a battery voltage to form a sampled voltage;
    a transconductance amplifier arranged for time-differentiating the sampled voltage; and
    a comparator circuit for comparing the time differentiated voltage to a predetermined reference voltage and switching an output voltage to control charging mode of the battery charger;
    wherein the sample and hold circuit includes a transistor for controllably coupling the battery voltage input to a capacitor.

2. A control circuit for a battery charger according to claim 1 and further comprising an input filter circuit for filtering noise on the battery voltage and providing a filtered battery voltage to the sample and hold circuit.

3. A control circuit for a battery charger according to claim 2 and further comprising a buffer circuit disposed between the filter circuit and the sample and hold circuit for restoring the filtered battery voltage so as to compensate for voltage decay in the filter circuit.

4. A control circuit for a battery charger according to claim 1 and further comprising an amplifier circuit for amplifying the battery voltage and providing an amplified battery voltage to the sample and hold circuit.

5. A control circuit for a battery charger according to claim 1 and further comprising:
    an input filter circuit for filtering noise on the battery voltage;
    a buffer circuit disposed between the input filter circuit and the sample and hold circuit for restoring the filtered battery voltage so as to compensate for voltage decay in the filter circuit; and
    further comprising an amplifier circuit disposed between the buffer circuit and the sample and hold circuit.

6. A control circuit for a battery charger according to claim 1 wherein the comparator circuit includes a reference voltage input for receiving a predetermined reference voltage for comparing an input voltage to the said reference voltage to detect a peak of the battery voltage.

7. A detector circuit for controlling a battery charger consisting of:
    a sample and hold circuit for periodically sampling a battery voltage to form a sampled voltage;
    a transconductance amplifier arranged for time-differentiating the sampled voltage; and
    a comparator circuit for comparing the time differentiated voltage to a predetermined reference voltage and switching an output signal to control a charging mode of the battery charger.

8. A detector circuit for controlling a battery charger consisting essentially of:
    a sample and hold circuit for periodically sampling a battery voltage to form a sampled voltage;
    a transconductance amplifier arranged for time-differentiating the sampled voltage; and
    a comparator circuit for comparing the time differentiated voltage to a predetermined reference voltage and switching an output signal to control a charging mode of the battery charger.

* * * * *